United States Patent [19]
Dijs

[11] Patent Number: 6,021,705
[45] Date of Patent: Feb. 8, 2000

[54] ASSEMBLY FOR USE IN A COFFEE MACHINE FOR PREPARING COFFEE

[75] Inventor: Daniel Albertus Jozef Dijs, Utrecht, Netherlands

[73] Assignee: Sara Lee/DE N.V., Utrecht, Netherlands

[21] Appl. No.: 09/164,141

[22] Filed: Sep. 30, 1998

[30] Foreign Application Priority Data

Sep. 30, 1997 [NL] Netherlands ............... 1007171

[51] Int. Cl.⁷ .................................................. A47J 31/00
[52] U.S. Cl. .............................. 99/295; 99/302 R; 99/307
[58] Field of Search ................................. 99/295, 302 R, 99/304, 305, 306, 307, 300; 426/433

[56] References Cited

U.S. PATENT DOCUMENTS

| | | |
|---|---|---|
| 3,450,024 | 6/1969 | Martin . |
| 3,620,155 | 11/1971 | Bixby, Jr. . |
| 5,287,797 | 2/1994 | Grykiewicz et al. ............ 99/295 |
| 5,347,916 | 9/1994 | Fond et al. ............ 99/295 |
| 5,649,472 | 7/1997 | Fond et al. ............ 99/295 |

FOREIGN PATENT DOCUMENTS

| | | |
|---|---|---|
| 3504441 | 2/1985 | Germany . |
| 9403616 | 3/1994 | Germany . |
| 9400837 | 5/1994 | Netherlands . |

*Primary Examiner*—Reginald L. Alexander
*Attorney, Agent, or Firm*—Welsh & Katz, Ltd.

[57] ABSTRACT

The assembly for use in a coffee machine comprises a container having a bowl-shaped inner space bounded by a bottom having at least one outlet opening and at least one vertical sidewall. The assembly further comprises a pill-shaped pouch manufactured from filtering paper and filled with ground coffee, accommodated in the inner space of the container. The pouch extends over the bottom to a position adjacent the vertical sidewall. In the bottom, a number of channel-shaped grooves are provided, extending in radial direction of the container to the outlet opening. The grooves extend from a position located at a distance from the sidewall in the direction of the outlet opening. This prevents bypass.

22 Claims, 3 Drawing Sheets

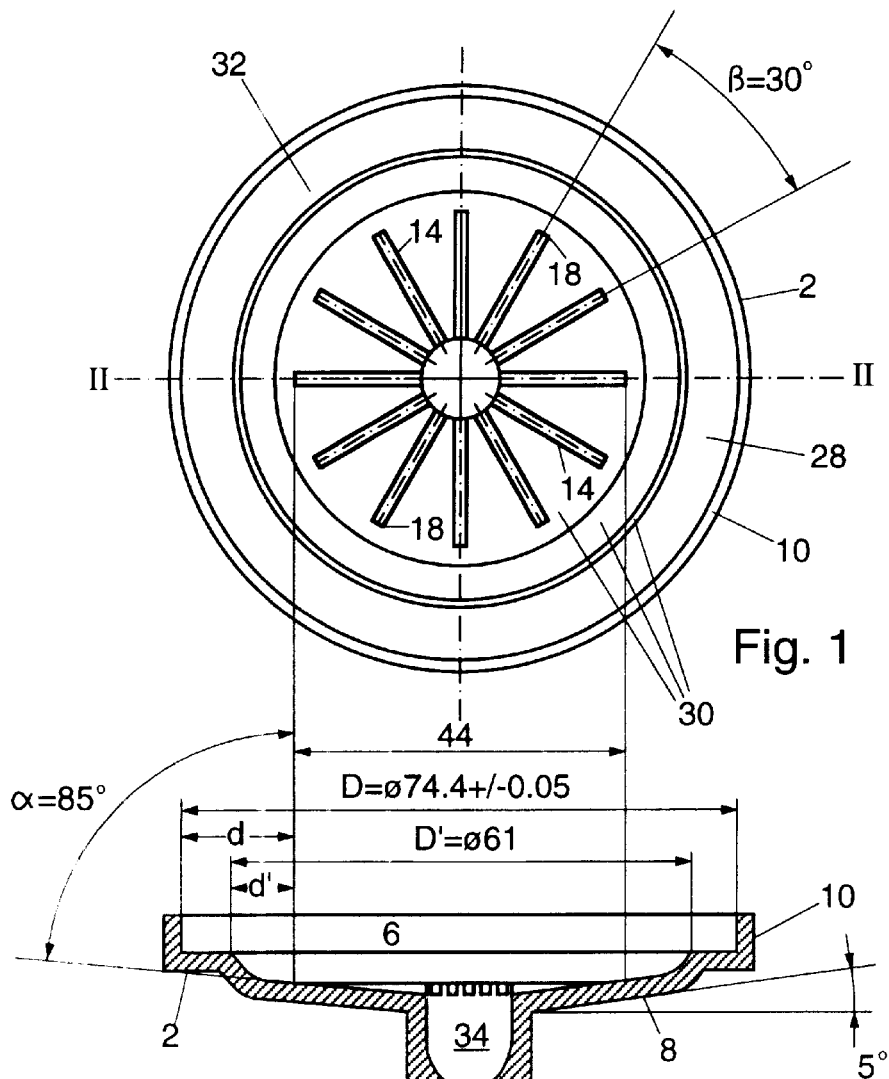
Fig. 1
Fig. 2
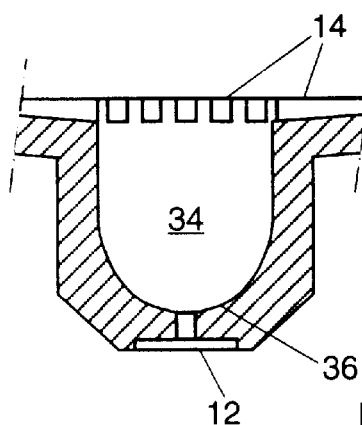
Fig. 3

ASSEMBLY FOR USE IN A COFFEE MACHINE FOR PREPARING COFFEE

The invention relates to an assembly for use in a coffee machine for preparing coffee, comprising a container having a bowl-shaped inner space bounded by a bottom having at least one outlet opening and at least one vertical sidewall and, included in the inner space of the container, a pill-shaped pouch manufactured from filtering paper and filled with ground coffee, which pouch rests on the bottom and extends over the bottom to a position adjacent the vertical sidewall, while provided in the bottom are a number of channel-shaped grooves extending in radial direction of the bowl-shaped inner space to the outlet opening and, in use, hot water is fed under pressure to a top side of the container by means of the coffee machine, causing the hot water to be pressed from a top side of the pouch through the pouch for extracting the ground coffee included in the pouch, the coffee extract formed flowing from a bottom side of the pouch and from the container via the outlet.

Such assembly is known from U.S. Pat. No. 3,620,155. The inner space of the container thereof is of rectangular design. From each corner point of the inner space, a groove extends to the outlet opening provided in the center of the bottom. The pouch is likewise of rectangular design and has dimensions corresponding to the dimensions of the inner space of the container. Accordingly, a circumferential edge of the pouch is located adjacent the vertical sidewall of the container.

A problem of the known assembly is that in use, a portion of the hot water that is poured onto the pouch flows along the side edge of the pouch to the end of a groove located at a corner point of the container. This hot water then flows via the groove directly to the outlet opening. This involves a so-called bypass effect. As a consequence, not the complete amount of hot water that is fed at the top side of the container flows via the pouch to the outlet opening. Consequently, the coffee extract, which is for instance received in a container disposed under the outlet opening, is diluted with hot water. This will give the coffee extract an undesired strength. It is not possible to make allowance for the bypass effect during the preparation of coffee, because it is not known beforehand what amount of water will flow around the pouch and, via the grooves, to the outlet opening.

The object of the invention is to provide a solution to the problem posed, and accordingly, the invention is characterized in that each of said grooves extends from a position located at a distance from the sidewall in a direction away from the sidewall.

As the grooves do not extend to the sidewall, this has the surprising result that the bypass effect is substantially decreased. In accordance with a first further elaboration of the invention, it applies that the channel-shaped grooves extend in radial direction of the bowl-shaped inner space to the outlet opening, each of said grooves extending from the position located at a distance from the sidewall in the direction of the outlet opening. In particular, in this variant, the bypass effect proves to be negligibly small when it applies that the smallest distance between each of said grooves on one side and the vertical sidewall on the other is greater than 10% of a maximum diameter of the inner space of the container.

Preferably, it applies that the smallest distance between each of said grooves on one side and the vertical sidewall on the other is at least substantially equal to 20% of the maximum diameter of the inner space of the container.

The pouch extends to a position adjacent the vertical sidewall of the container. This means that it is essential to the invention that the dimensions of the pouch and the container be adjusted to each other. When the pouch is for instance of smaller design, the undesired bypass effect will occur in spite of the fact that said grooves extend from a position located at a distance from the sidewall in the direction of the outlet opening. Hence, the invention is incorporated in the specific properties of the container and the specific dimensions of the pouch which correspond therewith.

In particular, a bottom of the pouch has a shape substantially corresponding to the shape of the bottom of the container. In that case, the extraction will be optimal and the bypass effect minimal.

Preferably, the pouch comprises a disk-shaped top sheet and a disk-shaped bottom sheet which are interconnected adjacent their longitudinal edges, the interconnected parts of the top and bottom sheets forming an annular sealing seam.

The width of each of the grooves may vary from, for instance, 1 to 4 mm. In particular, the width approximately equals 2 mm. If the width of the grooves is chosen too great, this has as a consequence that a relatively large portion of the filtering area will be clear. This entails the risk of too little pressure being built up in the container and the flow of liquid through the filter becoming too great. This has a negative effect on the coffee-making efficiency.

When the assembly is used for preparing one or two cups of coffee, it applies that the diameter of the inner space of the container is preferably approximately equal to 74 mm and that the diameter of the pouch is also approximately equal to 74 mm. Likewise, it applies that the diameter of a coffee bed formed in the pouch is in that case approximately equal to 61 mm. If the dimensions of the pouch are chosen to be different, i.e. greater or smaller, there is again the risk of bypass. Moreover, it has been found that in that case the coffee-making efficiency is not optimal, either. In accordance with a second further elaboration of the invention, it applies that the bottom is provided with a number of vertical projections which are arranged at regular distances relative to each other, said projections being formed by the interspaces formed between the vertical projections.

It is observed that U.S. Pat. No. 5,287,797 also discloses a container in which a pouch can be included for preparing coffee. The container comprises a bottom having vertical ribs. This arrangement implies that between the ribs recesses are present whose lowest point is formed by the bottom of the container. However, these recesses are so wide that no bottom having grooves is involved here. Indeed, the surface area covered by the recesses is greater than the surface area covered by the ribs. In accordance with the invention, however, it applies that the area of the grooves is smaller than the area of those parts of the bottom where no grooves are provided. Hence, in the above U.S. patent, no grooves according to the present invention are involved.

The invention will now be specified with reference to the accompanying drawings. In these drawings:

FIG. 1 is a top plan view of a first embodiment of a container according to the invention;

FIG. 2 is a cross section taken on the line II—II of FIG. 1;

FIG. 3 shows an enlarged part of FIG. 2;

Figure 5:
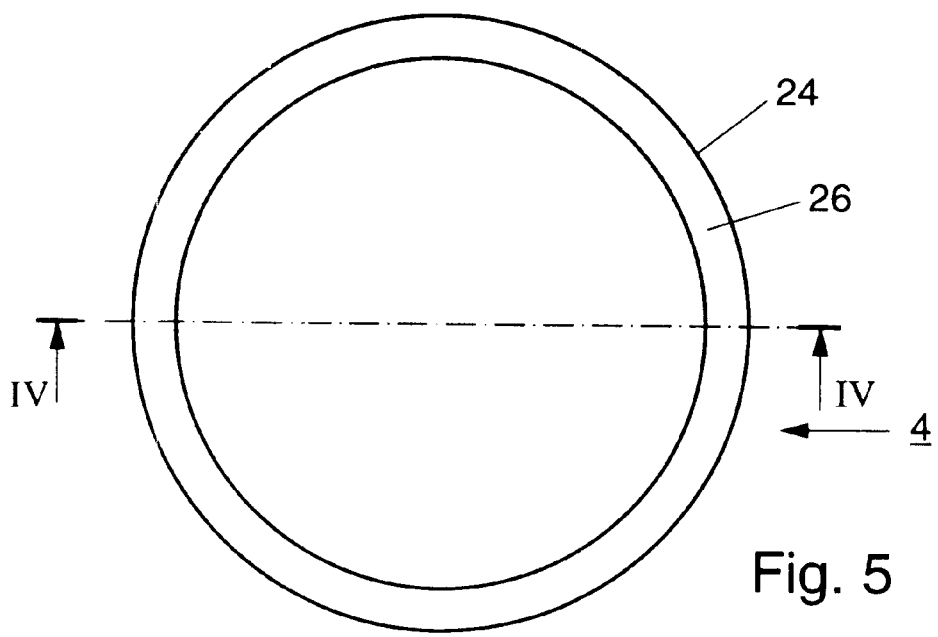
FIG. 5 is a top plan view of the pouch according to FIG. 4.

An assembly 1 according to the invention for use in a coffee machine for preparing coffee comprises a container 2 (see FIGS. 1–3 and FIG. 6) and a pouch 4 (see FIGS. 5–6) included in an inner space 6 of the container 2. The inner space 6 is of bowl-shaped design and is bounded by a bottom 8 and at least one vertical sidewall 10. Because in this example, the inner space 6 and the pouch 4 are of cylindrical design, this implies that the container 2 in fact only comprises a single vertical cylindrical sidewall 10 which is round and closed in itself.

Located in the bottom 8 is at least one and in this example only one outflow opening 12. Further provided in the bottom are a number of channel-shaped grooves 14 extending in radial direction of the inner space 6 to the outlet opening 12. The grooves each have a bottom 16 sloping down in the direction of the outlet opening 12. In this example, each bottom 16 of a groove 14 makes an angle $\alpha$ relative to the vertical which is equal to approximately 85°. It further applies that the grooves in this example each have a rectangular cross section. However, this is not necessarily the case. Other shapes are possible as well.

Each of the grooves 14 extends from a position 18 located at a distance from the sidewall 10 in the direction of the outlet opening 12. The total area occupied by the grooves is smaller than the total area of the bottom 8 that is not occupied by the grooves 14. In this example, the container is provided with 12 grooves, adjacent grooves enclosing an angle $\beta$ of about 30°.

Figure 4:
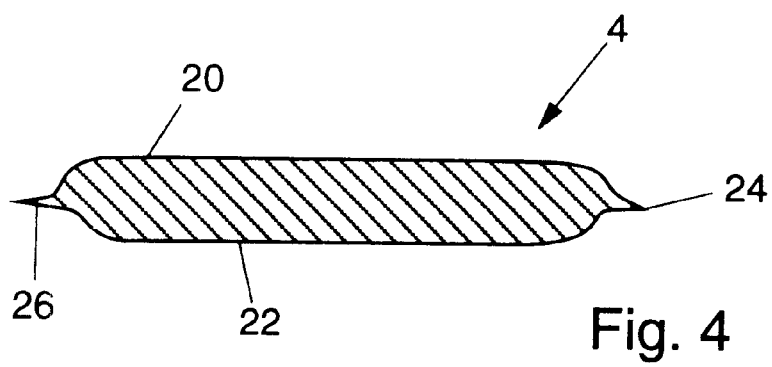
FIG. 4 is a cross section of a pouch taken on the line IV—IV of FIG. 5, associated with the container according to FIGS. 1–3.

The pouch 4 (see FIGS. 4 and 5) is pill-shaped and manufactured from filtering paper and filled with ground coffee. The pouch comprises a disk-shaped top sheet 20 manufactured from filtering paper and a disk-shaped bottom sheet 22 likewise manufactured from filtering paper. The disk-shaped bottom sheet and the disk-shaped top sheet are interconnected adjacent the longitudinal edges 24, the interconnected parts of the top and bottom sheets forming an annular sealing seam 26.

Figure 6:
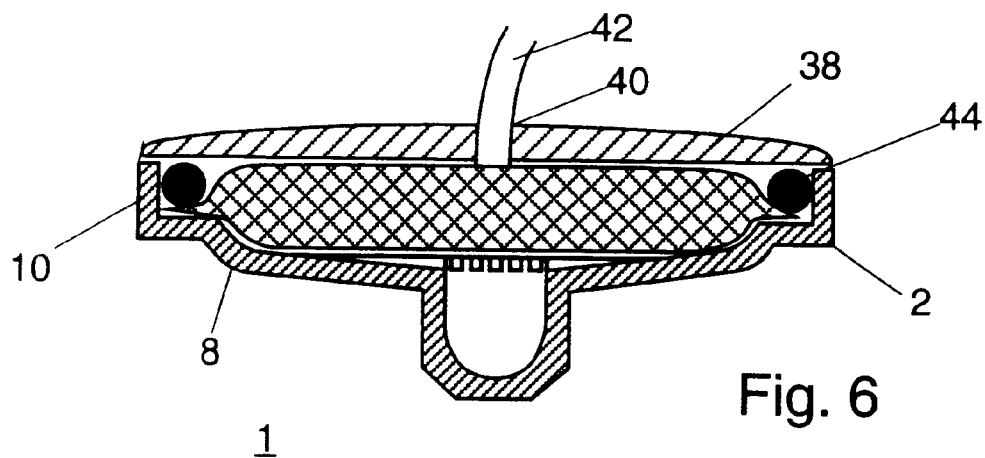
FIG. 6 is a cross section of an assembly according to the invention, consisting of the container of FIGS. 1–3 and the pouch of FIGS. 4 and 5.

When the pouch 4 is inserted into the container 2 (see FIG. 6), it extends over the bottom 8 of the container 2 to a position adjacent the vertical sidewall 10 of the container 2 (see also FIG. 6). In this example, it applies that the smallest distance d between each of said grooves 14 on one side and the vertical sidewall 10 on the other is greater than 10% of the maximum diameter D of the inner space of the container 2. In this example, it even applies that the smallest distance d between each of said grooves 14 on one side and the vertical sidewall 10 on the other is at least substantially equal to 20% of the maximum diameter D of the inner space of the container 2.

The bottom 8 comprises an outer horizontal annular bottom part 28 bounding the sidewall 10. The bottom 8 further comprises an inner saucer-shaped bottom part 30 bounding an inner edge 32 of the annular bottom part 28. Adjacent the annular bottom part 28, the saucer-shaped bottom part 30 slopes downwards in a direction away from the sidewall. In this example, the grooves extend exclusively in the saucer-shaped bottom part. More in particular, it applies in this example that each of said grooves extends from a position 18 located at a distance from the inner edge 32 of the annular bottom part 28 in the direction of the outlet opening 12. The container is preferably dimensioned such that the smallest distance d' between each of said channels 14 on one side and the inner edge 32 of the annular bottom part 28 on the other is greater than 10% of the maximum diameter D' of the saucer-shaped bottom part 30.

Provided in the center of the saucer-shaped bottom part 30 is a recess 34, with the outlet opening 12 being located in a bottom 36 of the recess 34. The pouch preferably has a bottom which in this example is formed by the bottom sheet 22 whose shape substantially corresponds to the shape of the bottom 8 of the container.

In use, the pouch 4 is inserted into the container 2, as shown in FIG. 6. The assembly 1 is then inserted into a coffee machine known per se. The coffee machine comprises a cover 38 closing off the assembly 1 as soon as it has been placed in the machine. The cover 38 comprises an opening 40 through which, via a hose 42, hot water can be fed to the inner space 6 of the container. Adjacent its circumferential edge, the cover further comprises a sealing ring 44 closed in itself.

The sealing seam 26 of the pouch 4 is located between the sealing ring 44 and the annular bottom part 28. When, in use, hot water is subsequently fed to the inner space 4 of the assembly via the hose 42, a pressure is created in the inner space 6. Due to this pressure, the sealing ring 44 moves outwards in radial direction to sealingly abut against the vertical sidewall 10. Next, the hot water will penetrate into the pouch 4 via the top sheet 20. In the pouch 4, the coffee extract is then formed. This coffee extract will subsequently leave the pouch again via the bottom sheet 22. In particular in places where the grooves 14 are present, the coffee extract can flow from the pouch. In positions between the grooves 14, little or no extract will in principle flow from the pouch. The effect thus achieved is that the hot water does not flow through the pouch too fast. This again results in that the coffee-making efficiency will be optimal.

The coffee extract ending up in the grooves 14 will subsequently flow to the recess 34 and leave the container 2 via the outlet opening 12. Under the container 2, a cup can for instance be placed which is filled with the coffee extract. As the channel-shaped grooves 14 slope downwards in the direction of the recess 34, a proper flow through the pouch is promoted. It is also guaranteed that no bypass occurs. This means that the hot water fed to the container does not flow to the outlet opening 12 without moving through the coffee bed included in the pouch. This is guaranteed in that in accordance with the invention, said grooves extend from a position 18 located at a distance from the sidewall in the direction of the outlet opening. Where no grooves are present, the bottom of the pouch 4 directly rests on the bottom of the container 8. Hence, at these positions, the hot water can hardly flow from the pouch, if at all. This implies that at first, no water can from to the outlet opening 12 from a top side of the pouch through the sealing seam of the pouch. If this actually happened, pure water, i.e. no coffee extract, would flow to the outlet opening 12, causing a bypass effect. The coffee extract received in a cup would then be diluted with hot water.

Because according to the present embodiment, it applies that the smallest distance d between each of the grooves on one side and the vertical sidewall on the other is greater than 10% of the maximum diameter D of the inner space of the container, it is guaranteed that the bypass effect will at least substantially not occur.

If the hot water flowed through the coffee bed at a position located adjacent the sealing seam 26, the effect occurring would be that the coffee-making efficiency is not optimal. After all, at this position, the height of the coffee bed is relatively low, so that the flow-through will be relatively fast. Moreover, the flow of liquid chooses the path of least resistance, so that a disproportionately large part of the hot water will flow through this portion of the coffee bed. As in accordance with the invention, it further applies that the smallest distance d' between each of the grooves on one side and the inner edge of the annular bottom part on the other is greater than 10% of the maximum diameter D' of the annular bottom part 28, it is provided that this effect does not occur and the coffee-making efficiency is in fact optimal. As it is, the channel-shaped grooves 14 do not extend to positions where the coffee bed of the pouch 4 is relatively thin. As the bottom of the pouch has a shape substantially corresponding to the shape of the bottom of the container, said dimensions of the grooves 14 can be optimally utilized. Because it applies in particular that the dimensions of the bottom disk-shaped sheet 22 from a center of the sheet to the annular sealing seam correspond to the dimensions of the saucer-shaped bottom part 30, it applies that said optimum extraction efficiency is achieved. It also applies that the annular sealing seam has dimensions substantially corresponding to the dimensions of the annular bottom part. This also implies that a pouch inserted into the container is optimally and unequivocally positioned in the container. The pouch as it were automatically searches the position in which it is supposed to be located.

In this example, the assembly is intended for preparing one cup of coffee. For that reason, the diameter of the inner space of the container is approximately equal to 74 mm. To effect that the bypass effect does not occur, it applies that the diameter of the pouch is also approximately equal to 74 mm. Of course, the other above-discussed conditions should be met as well in order to minimize the bypass effect. It further applies that the diameter of a coffee bed formed in the pouch is approximately equal to 61 mm. This diameter corresponds to the diameter of the annular bottom part 28. This diameter, too, is particularly suitable for preparing one cup of coffee. Since the two diameters are chosen to be equal, it moreover applies that when the above conditions are also met, the bypass effect is minimized, while the coffee-making efficiency is maximized.

Figure 7:
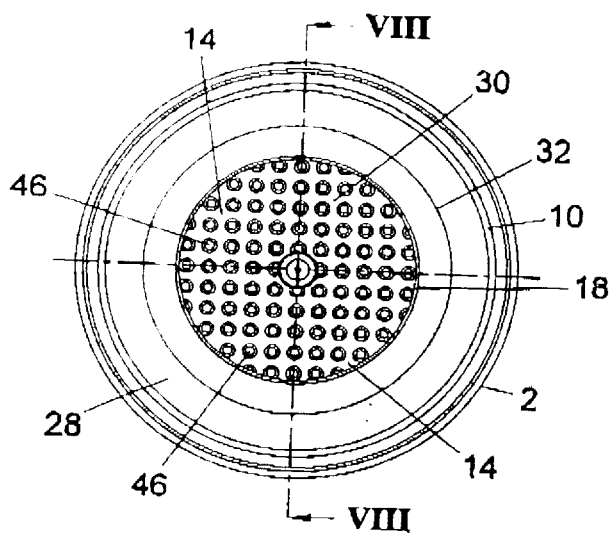
FIG. 7 is a top plan view of a second embodiment of a container according to the invention.
Figure 8:
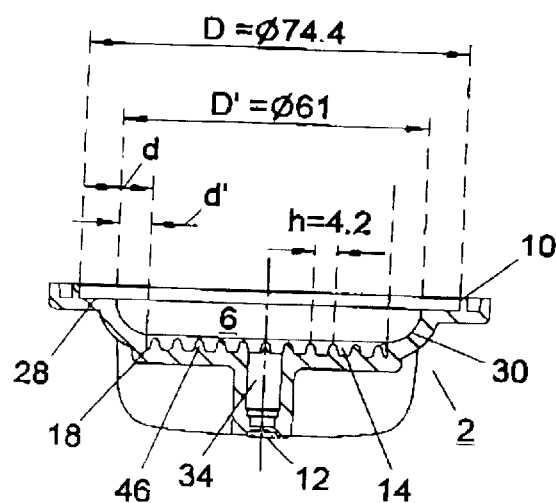
FIG. 8 is a cross section of the container according to FIG. 7.
Figure 9:
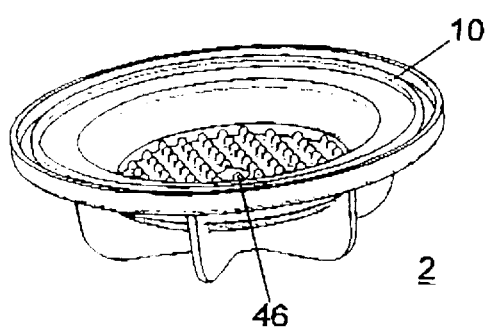
FIG. 9 is a side elevation of the container according to FIG. 7.
Figure 10:
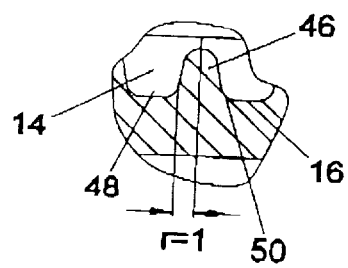
FIG. 10 shows a projection of the container according to FIG. 7.

The invention is by no means limited to the embodiment of the container outlined hereinabove. FIGS. 7–9 show an alternative embodiment of the container. Parts corresponding to those of the container which is discussed with reference to FIGS. 1–6 are provided with identical reference numerals.

The container entirely corresponds to the container discussed with reference to FIGS. 1–6, the difference being that the grooves 14 are shaped differently. In this example, however, it applies that the bottom is provided with a number of vertical projections arranged at regular distances relative to each other. The grooves 14 are formed by the interspaces formed between the vertical projections 46. In this example, the vertical projections 46 are substantially of cylindrical design. As is clearly visible in FIG. 7, the projections are arranged in rows and columns relative to each other. As a result, the channel-shaped grooves formed between the projections are in parallel and perpendicular arrangement relative to each other.

It further applies that at the bottom side 50 of the projections, the interspaces 49 formed between the projections cover 75–94% of the total surface area of the bottom that is provided with projections. Hence, this involves a total area of the saucer-shaped bottom part 30, less the portion of the saucer-shaped bottom part which, adjacent the annular bottom part 28, slopes downwards in a direction away from the sidewall.

It further applies that in this example, the projections have their top sides provided with a round tip. The operation of the container according to FIGS. 7–10 is completely analogous with that of the container according to FIGS. 1–6. In the container of FIGS. 7–9, the pouch of FIG. 4 can be placed. Also, the cover 38 can be used for closing off the container, the sealing ring 44 again being located within the vertical sidewall 10 of the container of FIGS. 7–10.

In accordance with another variant of the invention, the container may be provided with a larger number of projections 46 than shown in FIGS. 7–10. In that case, however, the projections may have a much smaller cross section.

In the embodiment outlined with reference to FIGS. 7–10, it applies that the center-to-center distance of the projections is 3–5 mm, in particular about 4.2 mm. The radius R adjacent the bottom side of the projections may vary from, for instance, 0.5 to 2 mm and is in this example about 1 mm. Such variants are each understood to fall within the framework of the invention.

As discussed hereinabove, the invention relates to a container on one side and a pouch on the other, optimally adjusted to each other. Hence, the invention is embodied both in the container and in the pouch. As the container has a. diameter of 74 mm, the pouch will have to have an at least substantially equal diameter. Accordingly, such pouch is understood to fall within the framework of the invention.

I claim:

1. An assembly for use in a coffee machine for preparing coffee, comprising a container having a bowl-shaped inner space bounded by a bottom having at least one outlet opening and at least one vertical sidewall and, included in the inner space of the container, a pill-shaped pouch manufactured from filtering paper and filled with ground coffee, which pouch rests on the bottom and extends over the bottom to a position adjacent the vertical sidewall, while provided in the bottom are a number of channel-shaped grooves extending in radial direction of the bowl-shaped inner space to the outlet opening and, in use, hot water is fed under pressure to a top side of the container by means of the coffee machine, causing the hot water to be pressed from a top side of the pouch through the pouch for extracting the ground coffee included in the pouch, the coffee extract formed flowing from a bottom side of the pouch and from the container via the outlet, wherein each of said grooves begins at a position spaced from the sidewall and extends in a direction away from the sidewall.

2. An assembly according to claim 1, wherein the channel-shaped grooves extend in radial direction of the bowl-shaped inner space to the outlet opening, each of said grooves extending from the position located at a distance from the sidewall in the direction of the outlet opening.

3. An assembly according to claim 2, wherein the smallest distance between each of said grooves on one side and the vertical sidewall on the other is greater than 10% of a maximum diameter of the inner space of the container.

4. An assembly according to claim 3, wherein the smallest distance between each of said grooves on one side and the vertical sidewall on the other is approximately equal to 20% of the maximum diameter of the inner space of the container.

5. An assembly according to claim 1, wherein the bottom is provided with a number of vertical projections arranged at regular distances relative to each other, said grooves being formed by the interspaces formed between the vertical projections.

6. An assembly according to claim 5, wherein the vertical projections are substantially cylindrical.

7. An assembly according to claim 5, wherein the projections are arranged in rows and columns relative to each other.

8. An assembly according to claim 5, wherein at the bottom side of the projections, the interspaces formed between the projections cover 75–94% of the total area of the bottom that is provided with projections.

9. An assembly according to claim 5, wherein the projections have their top sides provided with round tips.

10. An assembly according to claim 1, wherein the bottom consists of an outer horizontally directed annular bottom part bounding the sidewall and an inner saucer-shaped bottom part bounding an inner edge of the annular bottom part, the saucer-shaped bottom part adjacent the annular bottom part sloping downwards in a direction away from the sidewall.

11. An assembly according to claim 10, wherein the grooves extend in the saucer-shaped bottom part.

12. An assembly according to claim 11, wherein each of the grooves extends from a position located at a distance from the inner edge of the annular bottom part in the direction of the outlet opening.

13. An assembly according to claim 12, wherein the smallest direction between each of said grooves on one side and the inner edge of the annular bottom part on the other is greater than 10% of a maximum diameter of the annular bottom part.

14. An assembly according to claim 2, wherein the grooves have a rectangular cross section.

15. An assembly according to claim 10, wherein in the center of the saucer-shaped bottom part, a recess is provided, the outlet opening being located in a bottom of the recess.

16. An assembly according to claim 1, wherein a bottom of the pouch has a shape substantially corresponding to the shape of the bottom of the container.

17. An assembly according to claim 1, wherein the pouch comprises a disk-shaped top sheet and a disk-shaped bottom sheet which are interconnected adjacent their longitudinal edges, the interconnected parts of the top and bottom sheets forming an annular sealing seam.

18. An assembly according to claim 10, wherein dimensions of the bottom disk-shaped sheet from a center of the sheet to the annular sealing seam correspond to dimensions of the saucer-shaped bottom part.

19. An assembly according to claim 18, wherein the annular sealing seam has dimensions substantially corresponding to the dimensions of the annular bottom part.

20. An assembly according to claim 17, wherein the diameter of the inner space of the container is approximately equal to 74 mm and that the diameter of the pouch is approximately equal to 74 mm.

21. An assembly according to claim 17, wherein the diameter of the inner space of the container is approximately equal to 61 mm.

22. An assembly according to claim 1, wherein the inner space of the container is cylindrical, an axial axis of the inner space being at least substantially vertically directed.

* * * * *